United States Patent [19]

Koontz et al.

[11] 4,261,853

[45] Apr. 14, 1981

[54] DEFERRED ACTION BATTERY HAVING AN IMPROVED DEPOLARIZER

[75] Inventors: Ralph F. Koontz; Lloyd E. Klein, both of Fort Wayne, Ind.

[73] Assignee: Magnavox Government and Industrial Electronics Co., Fort Wayne, Ind.

[21] Appl. No.: 78,368

[22] Filed: Sep. 24, 1979

Related U.S. Application Data

[62] Division of Ser. No. 963,718, Nov. 22, 1978, Pat. No. 4,192,913.

[51] Int. Cl.³ .............................................. H01M 4/36
[52] U.S. Cl. .................................. 252/182.1; 429/118; 429/119; 429/220
[58] Field of Search ..................... 252/182.1; 429/118, 429/119, 220

[56] References Cited

U.S. PATENT DOCUMENTS

| | | | |
|---|---|---|---|
| 2,937,219 | 5/1960 | Minnick et al. | 429/118 |
| 3,132,054 | 5/1964 | Carson, Jr. | 429/118 |
| 3,205,096 | 9/1965 | Honer | 429/118 |
| 3,441,445 | 4/1969 | Ehrlich et al. | 429/119 |
| 3,445,290 | 5/1969 | Elliott et al. | 429/119 |
| 4,007,316 | 2/1977 | Koontz | 429/118 |
| 4,020,247 | 4/1977 | Birt et al. | 429/118 |

*Primary Examiner*—Leland A. Sebastian
*Assistant Examiner*—Irwin Gluck
*Attorney, Agent, or Firm*—William J. Iseman; William J. Streeter; Thomas A. Briody

[57] ABSTRACT

A deferred action battery having a magnesium alloy anode and a cathode depolarizer and a method for making the depolarizer. The depolarizer material comprises cuprous thiocyanate, a form of carbon and free sulphur. A metal grid is used as a current collector and a base for the cathode.

6 Claims, No Drawings

DEFERRED ACTION BATTERY HAVING AN IMPROVED DEPOLARIZER

This is a division of application Ser. No. 963,718 filed Nov. 27, 1978 now U.S. Pat. No. 4,192,913.

BACKGROUND OF THE INVENTION

This invention relates generally to the field of deferred action batteries and, more particularly, to a seawater activated deferred action battery having an improved depolarizer material comprised of cuprous thiocyanate, free sulphur, a form of carbon and a binder.

Silver chloride-magnesium seawater activated batteries are well-known in the prior art and have been in use for many years. However, these batteries are not only expensive but consume, without possibility of salvage, a relatively scarce precious metal. Prior endeavors have been made to develop a non-silver bearing depolarizer for use in seawater activated batteries. An example of one such endeavor that utilizes a depolarizer of heavy metal derivatives of aliphatic acids is described in U.S. Pat. No. 4,007,316 to Koontz. Such compounds as cuprous chloride, cuprous iodide and lead chloride are additional examples of prior art depolarizers which have been used in seawater activated batteries. However, many of these batteries have suffered one or more disadvantages of having a relatively short operating life, short storage life, or relatively low output voltage per unit cell.

SUMMARY OF THE INVENTION

Accordingly, it is an object of the present invention to provide a deferred action battery having an improved depolarizer. Another object of the invention is to provide a reserve or deferred action battery which eliminates the use of strategic materials such as silver. A further object of the invention is to provide a cathode depolarizer that is relatively insensitive to moisture so as to enable long storage periods at high temperatures and high humidity without degradation of battery performance. Yet another object of the present invention is to provide a deferred action battery wherein the output voltage of the battery is relatively high for a given size and weight.

Briefly, these and other objects are accomplished by a deferred action battery wherein the depolarizer material is comprised of a combination of cuprous thiocyanate, a form of carbon, free sulphur and an appropriate binder. An electrical conductor such as a metal grid is used both as a current collector and as a base for the cathode upon which the depolarizer is placed. The other electrode of the battery is an anode made from any suitable material such as magnesium, magnesium alloy, zinc or aluminum.

The deferred action battery is activated by ordinary seawater or distilled water or any other suitable aqueous solution.

For a better understanding of these and other aspects of the invention, reference may be made to the following detailed description.

DESCRIPTION OF THE PREFERRED EMBODIMENT

A typical reserve or deferred action battery has two electrodes known as a cathode and an anode. The battery is activated by addition of an electrolyte. In many deferred action batteries, the electrolyte is an aqueous solution ranging from distilled water to seawater. The electrodes are normally enclosed in a housing or case to hold the electrolyte and which provides a protective surrounding for the electrodes. If, for example, the battery is intended to be activated by seawater by dropping the battery in the ocean, then the case has openings provided at the top and bottom thereof to allow the seawater to conveniently enter the enclosed battery cell structure. A reserve or deferred action battery is one that has no output voltage until an electrolyte is added. A primary battery is one that has an electrolyte but it not rechargeable. Therefore, a battery used in accordance with the present invention can be said to be a deferred action primary battery since it is not intended to be recharged. Typically, a battery having a magnesium anode is not rechargeable since the electrochemical reaction is not reversible. However, if a zinc anode is used, the battery can be considered to be rechargeable although it cannot be recharged to its original capacity. The output power of a battery having a magnesium anode is higher than a battery having a zinc anode. However, a zinc anode does not produce as many solid and gaseous corrosion products as does a magnesium anode and therefore may be more suitable in a long-life application.

An example of an improved battery made in accordance with the present invention comprises a magnesium or magnesium alloy anode, a cathode having a depolarizer comprising copper thiocyanate, free sulphur, and a form of carbon such as acetylene black or graphite formed on a conductive metal grid. During the manufacturing of the cathode, the depolarizer mixture is heated to a temperature in excess of 120° C. in order to melt the sulphur. The heated mixture is then allowed to cool to room temperature. A small amount of tetrafluoroethylene (TFE) in combination with paraffin or wax may also be added to the depolarizer mixture in order to act as the binder. The anode of the battery may be in the form of a flat sheet or any other convenient configuration and may consist of alkali and alkaline earth metals. A commercially available magnesium alloy suitable for the anode carries the designation AZ61 and has the approximate composition, by weight, of 6.5% aluminum, 0.7% zinc and 0.2% manganese with the remainder magnesium. In one embodiment of the invention the copper thiocyanate depolarizer has, by weight, approximately 65% to 84% cuprous thiocyanate, 13% to 9% sulphur and 18% to 5% carbon. In most cases, cathode depolarizers are produced from powders and in many situations it is desirable to increase the electrical conductivity of the powder. Various portions of non-reactive conductive materials may be added to obtain the desired electrical conductivity. Carbon is a preferred material for this purpose because of its low cost and ready availability. Any of the various forms of carbon such as acetylene black, graphite or petroleum coke can be used. A binder such as TFE (3.9% to 1.9% by weight) is used to hold the powder together. TFE is a preferred binder since it has been found to be more efficient than an epoxy resin. The bindability of the TFE may also be enhanced by the addition of a small amount (0.1% by weight) of paraffin. In the present invention the free sulphur performs the dual role of an additional binder and as an ingredient that enhances the reaction. In order for the copper thiocyanate-sulphur combination to perform effectively, the sulphur is first melted by heating the mixture to a temperature of at least 120° C. and then cooled to room temperature. An electrical conductor such as a metal grid which may be in the form of a screen, expanded metal or perforated sheet stock is used to form the cathode. The cooled powder mixture is pressed on and into the metal grid and the metal grid not only performs as an electron collector but also lends strength and rigidity to the pressed powder cathode.

In addition to the anode and cathode, a spacer must be provided to separate the electrodes from one another. The spacer must be in such a form as to allow free access of electrolyte between the electrodes and to allow corrosion products resulting from the electrochemical reaction to exit from the cell. The spacer must be nonconductive and can be in the form of a small disc, rods or mesh. Chemical reaction between the magnesium anode and the electrolyte produces hydrogen gas and magnesium hydroxide. The gaseous product should be allowed to escape from between the electrodes. The escaping gas creates a pumping action which helps pull the solid corrosion product (magnesium hydroxide) out of the space and causes new electrolyte to enter. It will be understood by those skilled in the art that the solid corrosion products not removed from between the electrodes must be kept wet.

Ordinary tap water can be used as an electrolyte although seawater is preferred. Maximum power level will be reached faster with salt water than with distilled water. Salt increases the conductivity of the electrolyte by reducing resistance of the electrolyte.

The battery assembly is completed by the attachment of lead wires to the electrodes and enclosing the battery cell structure within a suitable encasement. Lead wires must extend from the encasement and the encasement must have openings so that the electrolyte can be allowed to enter between the electrodes. Those skilled in the art will understand that the electrochemical reaction between the electrodes and the electrolyte will generate heat and allowances must be made for the heat so generated.

A depolarizer is necessary in batteries to decrease polarization during current flow. A depolarizer is defined as a material which when used in conjunction with a cathode in an electrochemical system prevents polarization by preventing hydrogen gas formation at the cathode. Polarization occurs when the battery output voltage drops prematurely. The depolarizer maintains the electrode at a positive level by reacting with the nascent hydrogen formed at the electrode to form a compound which effectively prevents the formation of the hydrogen gas. As the cathode reducing reactions occur, positive ions are discharged, thereby forming negative ions. In other words, elements are reduced from a higher to a lower valence state.

The active electrode materials suitable for use within the depolarizer of the present invention can be described as an insoluble inorganic salt. The cation portion of the salt is a heavy metal element such as copper, usually in the lower valence form. The anion portion of the salt is selected from the group of pseudohalogens. By "pseudohalogens," it is meant those mono-valent radicals of the thiocyanate (CNS) group which behave chemically as halogens.

It has been observed that the deferred action battery with improved depolarizer of the present invention provides significantly more output voltage per battery cell than other seawater activated batteries of greater size and weight. For example, a single cell of the cuprous thiocyanate seawater activated battery of the present invention having a cathode area of 6.7 square inches exhibits an output voltage of approximately 1.4 volts in an aqueous electrolyte having a salinity of approximately 1.5%. In contrast, many batteries of the lead chloride type exhibit output voltages ranging from 0.9 volts to 1.1 volts from a single cell having a similar cathode area in an electrolyte of similar salinity.

Thus it may be seen that there has been provided a novel deferred action battery having an improved depolarizer which provides relatively high output voltage per battery unit cell and which utilizes active depolarizer materials that are commonly available and inexpensive.

Obviously, many modifications and variations of the invention are possible in light of the above teachings. It is therefore to be understood that within the scope of the appended claims the invention may be practiced otherwise than as specifically described.

What is claimed is:

1. A method for making a cathode depolarizer mixture comprising the following steps:
    mixing predetermined amounts of cuprous thiocyanate, sulphur and carbon to form a mixture;
    heating the mixture at least once to a temperature sufficient to melt the sulphur included therein; and
    cooling the heated mixture to substantially room temperature for forming the cathode depolarizer.

2. A method according to claim 1 wherein the step of mixing further includes mixing predetermined amounts of tetrafluoroethylene and paraffin to form said mixture.

3. A method for making a cathode depolarizer mixture comprising the following steps:
    mixing by weight substantially 65% to 84% cuprous thiocyanate, substantially 13% to 9% sulphur, substantially 18% to 5% carbon, substantially 3.9% to 1.9% tetrafluoroethylene and substantially 0.1% paraffin to form a mixture;
    heating the mixture at least once to a temperature sufficient to melt the sulfur included therein; and
    cooling the heated mixture to substantially room temperature for forming the cathode depolarizer.

4. A method for making a cathode depolarizer mixture comprising the following steps:
    mixing predetermined amounts of cuprous thiocyanate, sulphur, carbon and a binder to form a mixture;
    heating the mixture at least once to a temperature sufficient to melt the sulphur included therein; and
    cooling the heated mixture to substantially room temperature for forming the cathode depolarizer.

5. A method according to claim 4 wherein said binder is tetrafluoroethylene.

6. A method for making a cathode depolarizer mixture comprising the following steps:
    mixing by weight substantially 65% to 84% cuprous thiocyanate, substantially 13% to 9% sulphur, substantially 18% to 5% carbon and substantially 4% to 2% tetrafluoroethylene to form a mixture;
    heating the mixture at least once to a temperature sufficient to melt the sulphur included therein; and
    cooling the heated mixture to substantially room temperature for forming the cathode depolarizer.

* * * * *